(12) United States Patent
Metzger et al.

(10) Patent No.: US 7,625,589 B2
(45) Date of Patent: Dec. 1, 2009

(54) CHEESE WITH SODIUM GLUCONATE TO INHIBIT CALCIUM LACTATE CRYSTAL FORMATION

(75) Inventors: Lloyd E. Metzger, Champlin, MN (US); Donald A. Grindstaff, Apple Valley, MN (US)

(73) Assignees: Regents of The University of Minnesota, Minneapolis, MN (US); Nutricepts, Inc., Burnsville, MN (US)

( * ) Notice: Subject to any disclaimer, the term of this patent is extended or adjusted under 35 U.S.C. 154(b) by 683 days.

(21) Appl. No.: 11/197,956

(22) Filed: Aug. 5, 2005

(65) Prior Publication Data

US 2005/0281915 A1 Dec. 22, 2005

(51) Int. Cl.
*A23C 9/12* (2006.01)
*A23C 19/00* (2006.01)

(52) U.S. Cl. .............................. 426/36; 426/38; 426/39; 426/582

(58) Field of Classification Search .................... 426/34, 426/36, 38, 39, 40, 580, 582, 654
See application file for complete search history.

(56) References Cited

U.S. PATENT DOCUMENTS

| 1,708,099 | A | * | 4/1929 | Kernen | 426/36 |
|---|---|---|---|---|---|
| 1,890,948 | A | * | 12/1932 | Pasternack et al. | 426/582 |
| 2,011,074 | A | * | 8/1935 | Pasternack et al. | 426/334 |
| 2,065,183 | A | * | 12/1936 | Harris | 426/582 |
| 2,494,636 | A | * | 1/1950 | Stine | 426/36 |
| 5,186,965 | A | | 2/1993 | Fox et al. | |
| 5,397,589 | A | | 3/1995 | Korte et al. | |
| 5,478,590 | A | | 12/1995 | Merkenich et al. | |
| 6,113,953 | A | | 9/2000 | McMahon et al. | |
| 6,326,038 | B1 | | 12/2001 | Brafford | |
| 6,500,463 | B1 | | 12/2002 | van Lengerich | |
| 6,814,995 | B1 | | 11/2004 | Sotoyama et al. | |

OTHER PUBLICATIONS

Nair et al. "Reduction of Salt (NaCl) Losses During the Manufacture of Cheddar Cheese", J. Dairy Sci. 2004, vol. 87, p. 2831-2838.
Visser, "Proteolytic Enzymes and Their Relation to Cheese Ripening and Flavor: An Overview", J. Diary Sci. 1993, vol. 76, p. 329-350.
Mistry et al., "Influence of Salt on the Quality of Reduced Fat Cheddar Cheese", J. Dairy Sci. 1998, vol. 81, p. 1214-1221.
Johnson et al., "Effect of Packaging and Storage Conditions on Calcium Lactate Crystallization on the Surface of Cheddar Cheese", J. Dairy Sci. 1990, vol. 73, p. 3033-3041.
Swearingen et al., Factors Affecting Calcium Lactate and Liquid Expulsion Defects in Cheddar Cheese, Journal of Dairy Science, 2004, 87:574-582, American Dairy Science Assoc.
Kubantseva et al., Factors Affecting Solubility of Calcium Lactate in Aqueous Solutions, Journal of Dairy Science, 2004, 87:863-867, American Dairy Science Association.
Acharya et al., Comparison of Effect of Vacuum-Condensed and Ultrafiltered Milk on Cheddar Cheese, Journal of Dairy Science, 2004, 87:4004-4012, American Dairy Science Assoc.
PMP Fermentation Products, Inc., Gluconate Handbook, pp. 1-47.
Wei, A Clear Choice: Calcium Salts for Juices & Bottled Water, Food & Beverage Asia, Oct. 2003, 44-45.
PL Thomas & Company, Magnesium & Calcuim in your Beverage?, PLT Press, Summer 2003, Morristown, NJ.
Gerstner, Calcium Lactate Gluconate—the innovative solution for extra calcium, Jungbunzlauer—What's up.

* cited by examiner

*Primary Examiner*—Leslie Wong
(74) *Attorney, Agent, or Firm*—Shewchuk IP Services, LLC; Jeffrey D. Shewchuk

(57) ABSTRACT

Sodium gluconate is added to the typical cheese-making recipe to inhibit the growth of calcium lactate crystals as the cheese ages. The sodium gluconate is preferably added with sodium chloride or shortly after sodium chloride as part of the salting step. The amount of sodium gluconate is within the range of greater than zero to 10% of the weight of the curd, to result in a cheese having 0.26 to 2.8% gluconate in the cheese. The amount of sodium gluconate added for other cheeses can be based upon the lactate content and salt retention of the cheese.

21 Claims, No Drawings

CHEESE WITH SODIUM GLUCONATE TO INHIBIT CALCIUM LACTATE CRYSTAL FORMATION

CROSS-REFERENCE TO RELATED APPLICATION(S)

None.

BACKGROUND OF THE INVENTION

The present invention relates to the making of cheese, and particularly to the making of cheese ripened for two or more months such as Cheddar and Colby cheese.

Milk from many different mammals is used to make cheese, though cow's milk is the most common milk for cheese. Generally, cheese is made by developing acidity in milk and setting the milk with a clotting agent, such as rennet. The set milk is cut and whey is separated from the resulting curd. The curd may be pressed to provide a cheese block. Rennet-based cheeses include cheeses such as mozzarella, Cheddar, Swiss, and Colby cheese. Typical Cheddar cheese has 1.4 g lactate per 100 g and contains 37.5% water.

Curing typically takes place over a lengthy period of time under controlled conditions. Cheddar cheese, for example, is cured for a period of at least four months and may be cured for a period in excess of one year to obtain the full flavor desired in cheddar cheese.

Recently, use of concentrated milk as the base ingredient for making cheese has become more popular. Milk can be concentrated prior to cheese making using a variety of techniques including ultra-filtration, micro-filtration, vacuum condensation, or the addition of dry milk solids such as nonfat dry milk. The use of concentrated milk provides increased efficiency to the cheese-making process. Use of concentrated milk also reduces the amount of whey produced for a given amount of cheese, facilitates standardization of formulation and production, and promotes more consistent quality and yields of the resultant cheese. The use of concentrated milk thus lowers cost and processing times for making cheese, particularly beneficial for semi-continuous cheese manufacturing processes such as utilized in typical large-scale cheese plants. The semi-continuous cheese manufacturing includes numerous cheese vats that sequentially feed a draining/conveying belt and a salting belt. This semi-continuous cheese making system requires consistent and rapid production of acid by starter cultures used in the cheese manufacturing process. The efficiency of semi-continuous cheese manufacturing is substantially improved if the milk is concentrated prior to cheese-making.

During the aging process, calcium lactate crystals can grow within and on the surface of cheese. These crystals are small white spots that can be seen, often without magnification, upon close inspection of the cheese. The crystals are not present in the cheese immediately after manufacture, but typically start to appear between two and six months of aging. While the calcium lactate crystals are not harmful to consumers, they can be perceived in mouthfeel as adding a slight amount of grittiness to the cheese. More importantly for affecting cheese sales, consumers often believe the crystals are mold. The growth of calcium lactate crystals is thus viewed as a defect representing substantial financial loss for cheese manufacturers.

For reasons that are not entirely clear, the use of concentrated milk and a semi-continuous cheese making process in making an aged cheese seems to worsen the calcium lactate crystal problem. Consequently cheese manufacturers have an unenviable choice: they can either use a less efficient cheese-making process, or they can use a more efficient manufacturing process that more likely results in calcium lactate crystals defects.

Factors influencing the formation of calcium lactate crystals have been extensively studied. Concentrations of calcium and lactate ions existing in cheese serum are very close to saturation, and small increases in the concentration of either component could result in super saturation and crystallization. It has also been theorized that milk citrate levels and the subsequent utilization of citrate by microorganisms may play a role in calcium lactate formation. Curd washing, curing, and storage temperature may further contribute to calcium lactate crystal formation. Other studies report that calcium lactate is formed when L(+)-lactate is converted into a racemic mixture of L(+)- and D(−)-lactate, the latter being much more prone to crystallization. The conversion of L(+)-lactate to D(−)-lactate is thought to be carried out by certain strains of bacteria.

Prior art methods for limiting calcium lactate crystal formation in cheese include: 1) reducing the concentration of lactic acid in the final curd, 2) reducing or eliminating undesirable non-starter lactic acid bacteria ("NSLAB") from the cheese-making process, 3) controlling storage temperature, and 4) vacuum packaging cheese to minimize the airspace around the outer cheese surface. The use of certain starter culture strains may also increase or decrease the presence of calcium lactate crystals, due to post manufacture fermentation by the selected starter culture.

Although progress has been made in developing strategies for prevention of calcium lactate crystals, the defect is still prevalent. Better methods of minimizing calcium lactate crystal formation in aged cheeses are needed.

BRIEF SUMMARY OF THE INVENTION

The present invention is a method of adding sodium gluconate to the typical cheese-making recipe to inhibit the growth of calcium lactate crystals as the cheese ages, and the cheese composition made by the addition of sodium gluconate. The preferred method of adding the sodium gluconate is during or immediately after the salting stage of the cheese-making process.

DETAILED DESCRIPTION

The present invention modifies conventional cheese-making and begins, as all cheeses do, with milk. Preferably the milk is whole cow's milk having 3 to 4% butterfat and in excess of 7% solids non-fat. However, it is believed that cheeses formed from milk of other mammals will similarly benefit from the present invention, as will cheeses formed from milks with different fat (including non-fat) and/or different solids non-fat concentrations.

The preferred milk starting ingredient is preferably concentrated to achieve efficiencies in the cheese-making process. Preferably the solids content of the milk is increased to have total solids within the range of 13 to 50%, more preferably within the range of 13 to 18%, and most preferably to have total solids within the range of 14 to 15%. While the concentrated milk could be formed merely by adding condensed skim milk, ultra-filtered skim milk, micro-filtered skim milk or non-fat dry milk solids to the starting milk, more preferably the concentrated milk includes an addition of fat as well as non-fat milk solids. The preferred concentrated milk may thus be formed by adding various amounts of condensed skim milk, ultra-filtered skim milk, micro-filtered skim milk or non-fat dry milk solids and cream to whole milk, thereby retaining the ratio of casein to fat present in whole milk. Calcium chloride may be added to the milk ingredient to generate firmer curds. Fortifying ingredients or colorings may also be added to the milk ingredient.

The milk ingredient is acidified. If desired, the acidification can be achieved by adding an acidic ingredient, such as citric acid or tartaric acid, or through natural bacterial acidification. More preferably, the acidification is achieved by adding a starter culture, such as a mesophilic (*lactococcus lactis* ssp cremoris), thermophilic (*streptococcus thermophilus*) or helvetic (*lactobacillus helveticus*) bacteria culture. Most preferably (for Cheddar cheese) a mesophilic starter culture is used. If a starter culture is used, the mixture is then incubated between about 10 and 60 minutes, preferably about 30 minutes at a temperature between about 30 and 37° C., preferably about 31 to about 32° C.

After incubation, a coagulating agent, preferably rennet at about 0.02 to about 0.1 percent, is added to act on the casein and cause the milk ingredient to coagulate. The rennet may be animal, microbial or vegetable. The mixture is further incubated between about 10 and 60 minutes, preferably about 30 minutes, at a temperature between about 30 and 37° C., preferably about 31 to about 32° C. The addition of a coagulating agent, preferably rennet, causes the milk to coagulate into a mass.

After coagulation, the mass is cut, stirred, and heated (i.e., from about 30 to about 42° C. and preferably from about 31 to about 39° C.) for between about 10 and about 60 minutes, preferably about 30 minutes. The whey is drained off and the curd is matted into a cohesive mass in the traditional Cheddaring process or is intermittently stirred when using the stirred curd process. Subsequently in the traditional Cheddar process the mass is cut into pieces and salted, whereas in the stirred curd process the curd is simply salted. About 1 to about 4% salt, and preferably about 1.5 to about 3% salt is added to the curd. The preferred salt is sodium chloride added most preferably (for a Cheddar cheese) at about 2.75%. The salted curd is stirred, further drained and pressed into forms. Approximately 65-90% of the salt added is retained in the cheese, and thus consequently a typical Cheddar cheese has 1.5 to 2.0% salt. The cheese is then aged for a time period in excess of one week, preferably from one month to one year, and most preferably about 4 months prior to consumption.

Within this conventional cheese-making process and prior to aging, sodium gluconate is added. The sodium gluconate could, for instance, be added to the starting milk ingredient, to the concentrated milk, to the starter culture or to the rennet. The preferred method for adding sodium gluconate, however, is during or immediately after the salting step. This allows the use of a granulate form of sodium gluconate while minimizing the amount of sodium gluconate lost during whey separation, and without needlessly increasing the processing complexity of the cheese. The sodium gluconate appears to decrease the growth of calcium lactate crystals in cheese.

The sodium gluconate of the present invention is added in a range of greater than zero to 10% by weight, and more preferably within a range of greater than zero to 5% by weight. The sodium gluconate added results in the inclusion of greater than zero to 5.8% gluconate in the final cheese product, and more preferably greater than zero to 4.5% gluconate in the final cheese product. Even more preferably, sodium gluconate is added within the range of about 0.32 to 4.73% by weight and results in about 0.26 to 2.8% gluconate in the final cheese product.

Most preferably, the amount of sodium gluconate added is gauged based upon the lactate content of the cheese and the amount of sodium gluconate retained in the cheese to remain in the final cheese product in a sufficient amount to prevent the formation of calcium lactate crystals. For instance, the normal range of lactate found in Cheddar cheese is 1.1 to 1.9%, and preferably the sodium gluconate is added so the gluconate content of the cheese is within the range of about ¼ to ⅔ the lactate content of the cheese. Sodium gluconate added during or immediately after the salting step of cheese manufacture is believed to be retained at a rate similar to the retention of the sodium chloride salt, approximately 65-90%. For a Cheddar cheese containing 1.1% lactate in the final product, if the salt retention is found to be 90%, sodium gluconate is added within the range of about 0.32 to 2.0% by weight. The sodium gluconate added in the salting process is believed to be retained at a similar rate to the sodium chloride, and this 0.32 to 2.0% addition results in about 0.29 to 1.8% sodium gluconate to combat against calcium lactate crystal formation from the 1.1% lactate. Sodium gluconate is about 89% gluconate by weight, so the 0.29 to 1.8% sodium gluconate results in the inclusion of about 0.26 to 1.6% gluconate in the final cheese product. On the other end of the spectrum, for a Cheddar cheese containing 1.9% lactate in the final product, if the salt retention is found to be 65%, sodium gluconate is added within the range of about 0.77 to 4.7% by weight, resulting in about 0.50 to 3.1% sodium gluconate to combat against calcium lactate crystal formation from the 1.9% lactate. The 0.5 to 3.1% sodium gluconate results in the inclusion of about 0.45 to 2.8% gluconate in the final cheese product.

Different amounts of sodium gluconate would be added if the addition occurred at a different stage of the cheese-making process other than the salting step or immediately after the salting step. By adding the sodium gluconate during the salting step or immediately after the salting step, most of the sodium gluconate remains in the cheese product at the time of purchase and consumption. This provides a double benefit to cheese manufacturers, in that the sodium gluconate becomes an edible part of the final cheese product. That is, the addition of 0.32 to 4.73% sodium gluconate results in 0.29 to 3.1% more cheese being manufactured and sold, and the additional weight sold adds revenue for the cheese manufacturer.

Example 1

Concentrated milk was prepared by mixing 500 pounds of whole milk (3.8% butterfat) with 10 pounds of non-fat dry milk and 10 pounds of cream (40% butterfat), thereby forming concentrated milk with approximately 14.5% total solids. The concentrated milk was then used to manufacture Cheddar cheese using a conventional milled curd method. A direct vat set, frozen, concentrated starter culture (Marschall® Superstart® concentrated cultures, Strain M30 and M42, Rhodia, Inc., Dairy Business, Madison, Wis.) was used to manufacture the cheese. A total of 36 ml of starter culture (18 ml of each strain) and 15.6 ml of color (AFC-WS-1x, Chr. Hansen, Inc., Milwaukee, Wis.) were added to the concentrated milk, which was maintained at 31° C. After a 45-minute ripening period, 24 ml of rennet (Chy-max, Chr. Hansen, Inc., Milwaukee, Wis.) diluted with 500 ml of deionized water were added to the concentrated milk. After 25-30 minutes the resultant coagulum was cut, allowed to heal for 5 minutes and then gently stirred for an additional five minutes. Subsequently the curds and whey were cooked with continuous stirring to 38° C. in 30 minutes and were then held at 38° C. for an additional 30 min. After the curds and whey reached a pH of 6.25 (30 to 45 minutes) the whey was drained and the curds were ditched and packed. The matted curd was then cut into slabs, flipped and stacked in 20-minute intervals until the curd reach a pH of 5.4. A pH of 5.4 was reached 1.5 to 2 hour after the whey was drained. The slabs of curd were then milled and approximately 60 lbs of milled curd were obtained. The 60 lbs of milled curd were then divided in half. Two separate salting treatments were then applied to each portion of the curd. One half of the milled curd (30 lbs) was salted at a rate of about 2.75% with sodium chloride (0.825 lbs). The sodium chloride was applied in three equal portions (0.275 lbs each) and the curd was mixed for 10 minutes between each sodium chloride application. The remaining curd (30 lbs) was salted at a rate of about 2.75% sodium chloride (0.825 lbs) and 2.4% sodium gluconate (0.72 lbs, PMP Fermentation Products, Peoria, Ill.), such that the total sodium chloride/sodium gluconate addition was about 5.15% (1.545 lbs). The sodium chloride and sodium gluconate were applied in three equal portions (0.275 lbs and 0.24 lbs for the sodium chloride and sodium gluconate respectively) and the curd was mixed for 10 minutes between each sodium chloride/sodium gluconate application. Subsequently the curds from the control cheese with standard salting using only sodium chloride and curd with sodium chloride and sodium gluconate added were hooped and pressed overnight into two separate blocks weighing approximately 24-26 lbs.

Both cheese blocks were ripened under refrigeration for seven days. After one week of ripening the cheese from each cheese block was cut into 20-25 1 lb blocks. Each block was vacuum-sealed in clear wrapping. The vacuum-sealed cheese blocks were aged under refrigeration for two months. The pH, lactic acid content and moisture content of the control cheese was 5.13, 1.87%, and 38.84% respectively, whereas the pH, lactic acid content, gluconate content and moisture content of the sodium gluconate cheese was 5.44, 1.51%, 1.29% and 40.32% respectively. It is recognized that the maximum moisture content allowed in Cheddar cheese is 39% and that minor adjustments in the cheese making procedure for the cheese containing sodium gluconate will be required to reduce the moisture content to less than 39%.

After two months of aging, the blocks of both cheeses were inspected for the presence of calcium lactate crystals. Each of the blocks of cheese obtained from the standard salting control treatment had calcium lactate crystals visibly present on the cheese surface as well as the cheese interior. None of the blocks of cheese from the sodium gluconate treatment had any visible calcium lactate crystals present. The cheese blocks from the sodium gluconate treatment exhibited less weeping than the standard cheese.

The resultant cheese from the sodium gluconate treatment tasted smooth and smelled pleasant, with no perceptible offtaste, mouthfeel or odor added due to the sodium gluconate addition. As an additional secondary benefit, the sodium gluconate treatment slightly suppressed bitterness in the cheese.

Example 2

Concentrated milk was prepared by mixing 500 pounds of whole milk (3.8% butterfat) with 10 pounds of non-fat dry milk and 10 pounds of cream (40% butterfat), thereby forming concentrated milk with approximately 14.5% total solids. The concentrated milk was then used to manufacture Cheddar cheese using a stirred curd method. A bulk starter culture was prepared by inoculating steamed reconstituted NFDM with a direct vat set, frozen, concentrated starter culture (Marschall® Superstart® concentrated cultures, Strain M46, Rhodia, Inc., Dairy Business, Madison, Wis.) and incubating overnight. The concentrated cheese milk was then inoculated with the bulk culture at a rate of 2%. Additionally 15.6 ml of color (AFC-WS-1x, Chr. Hansen, Inc., Milwaukee, Wis.) were added to the concentrated milk. The concentrated milk was then maintained at 31° C. for a 45-minute ripening period. Subsequently, 24 ml of rennet (Chy-max, Chr. Hansen, Inc., Milwaukee, Wis.) diluted with 500 ml of deionized water were added to the concentrated milk. After 25-30 minutes the resultant coagulum was cut, allowed to heal for 5 minutes and then gently stirred for an additional five minutes. Subsequently the curds and whey were cooked with continuous stirring to 38° C. in 30 minutes and were then held at 38° C. for an additional 30 min. After the curds and whey reached a pH of 6.30 (30 to 45 minutes) the whey was drained and the curds were intermittently stirred until the curd reach a pH of 5.4. A pH of 5.4 was reached 1.5 to 2 hour after the whey was drained. Approximately 60 lbs of curd were obtained and subsequently divided in half. Two separate salting treatments were then applied to each portion of the curd. One half of the curd (30 lbs) was salted at a rate of about 2.75% with sodium chloride (0.825 lbs). The sodium chloride was applied in three equal portions (0.275 lbs each) and the curd was mixed for 10 minutes between each sodium chloride application. The remaining curd (30 lbs) was salted at a rate of about 2.75% sodium chloride (0.825 lbs) and 2.4% sodium gluconate (0.72 lbs, PMP Fermentation Products, Peoria, Ill.), such that the total sodium chloride/sodium gluconate addition was about 5.15% (1.545 lbs). The sodium chloride and sodium gluconate were applied in three equal portions (0.275 lbs and 0.24 lbs for the sodium chloride and sodium gluconate respectively) and the curd was mixed for 10 minutes between each sodium chloride/sodium gluconate application. Subsequently the curds from the control cheese with standard salting using only sodium chloride and curd with sodium chloride and sodium gluconate added were hooped and pressed overnight into two separate blocks weighing approximately 24-26 lbs.

Both cheese blocks were ripened under refrigeration for seven days. After one week of ripening the cheese from each cheese block was cut into 20-25 1 lb blocks. Each block was vacuum-sealed in clear wrapping. The vacuum-sealed cheese blocks were aged under refrigeration for two months. The pH, lactic acid content and moisture content of the control cheese was 5.35, 1.08%, and 39.0% respectively, whereas the pH, lactic acid content, gluconate content and moisture content of the sodium gluconate cheese was 5.42, 1.01%, 0.79% and 42.51% respectively. It is recognized that the maximum moisture content allowed in Cheddar cheese is 39% and that minor adjustments in the cheese making procedure for the cheese containing sodium gluconate will be required to reduce the moisture content to less than 39%.

After two months of aging, the blocks of both cheeses were inspected for the presence of calcium lactate crystals. Each of the blocks of cheese obtained from the standard salting control treatment had calcium lactate crystals visibly present on the cheese surface as well as the cheese interior. None of the blocks of cheese from the sodium gluconate treatment had any visible calcium lactate crystals present. The resultant cheese from the sodium gluconate treatment tasted smooth and smelled pleasant, with no perceptible offtaste, mouthfeel or odor added due to the sodium gluconate addition.

Example 3

Concentrated milk was prepared by mixing 500 pounds of whole milk (3.8% butterfat) with 10 pounds of non-fat dry milk and 10 pounds of cream (40% butterfat), thereby forming concentrated milk with approximately 14.5% total solids. The concentrated milk was then used to manufacture Cheddar cheese using a stirred curd method. A direct to vat set frozen, concentrated starter culture (Marschall® Superstart® concentrated cultures, Strain M62, Rhodia, Inc., Dairy Business, Madison, Wis.) was added to the concentrated cheese milk in an amount of 64 ml. Additionally 15.6 ml of color (AFC-WS-1x, Chr. Hansen, Inc., Milwaukee, Wis.) were added to the concentrated milk. The concentrated milk was then maintained at 31° C. for a 45-minute ripening period. Subsequently, 24 ml of rennet (Chy-max, Chr. Hansen, Inc., Milwaukee, Wis.) diluted with 500 ml of deionized water were added to the concentrated milk. After 25-30 minutes the resultant coagulum was cut, allowed to heal for 5 minutes and then gently stirred for an additional five minutes. Subsequently the curds and whey were cooked with continuous stirring to 38° C. in 30 minutes and were then held at 38° C. for an additional 30 min. After the curds and whey reached a pH of 6.30 (30 to 45 minutes), the whey was drained and the curds were intermittently stirred until the curd reach a pH of 5.4. A pH of 5.4 was reached 1.5 to 2 hours after the whey was drained. Approximately 60 lbs of curd were obtained and subsequently divided in half. Two separate salting treatments were then applied to each portion of the curd. One half of the curd (30 lbs) was salted at a rate of about 2.5% with sodium chloride (0.75 lbs). The sodium chloride was applied in three equal portions (0.25 lbs each) and the curd was mixed for 10 minutes between each sodium chloride application. The remaining curd (30 lbs) was salted at a rate of about 1.70% sodium chloride (0.51 lbs) in two equal portions (0.255 lb) and the curd was mixed for 10 minutes between each sodium chloride application. Subsequently 3.0% sodium gluconate (0.90 lbs, PMP Fermentation Products, Peoria, Ill.) was applied in one application and the curd was mixed for 10 minutes. Subsequently the curds from the control cheese with standard salting using only sodium chloride and curd with sodium chloride and sodium gluconate added were hooped and pressed overnight into two separate blocks weighing approximately 24-26 lbs.

Both cheese blocks were ripened under refrigeration for seven days. After one week of ripening the cheese from each cheese block was cut into 20-25 1 lb blocks. Each block was vacuum-sealed in clear wrapping. The vacuum-sealed cheese blocks were aged under refrigeration for two months. The pH, lactic acid content and moisture content of the control cheese was 5.25, 1.24%, and 33.05% respectively, whereas the pH, lactic acid content, gluconate content and moisture content of the sodium gluconate cheese was 5.41, 1.03%, 1.40% and 34.5% respectively.

After two months of aging, the blocks of both cheeses were inspected for the presence of calcium lactate crystals. Each of the blocks of cheese obtained from the standard salting control treatment had calcium lactate crystals visibly present on the cheese surface as well as the cheese interior. None of the blocks of cheese from the sodium gluconate treatment had any visible calcium lactate crystals present. The resultant cheese from the sodium gluconate treatment tasted smooth and smelled pleasant, with no perceptible offtaste, mouthfeel or odor added due to the sodium gluconate addition.

Although the present invention has been described with reference to preferred embodiments, workers skilled in the art will recognize that changes may be made in form and detail without departing from the spirit and scope of the invention.

The invention claimed is:

1. A method of making cheese comprising:
   providing sodium gluconate;
   developing acidity in milk and setting the milk;
   separating whey from the set milk to produce curd;
   adding salt to the curd; and
   pressing the salted curd into cheese; wherein the sodium gluconate is added to one or more of the milk, the set milk, or the curd, and wherein the cheese is selected from the group consisting of:
   Cheddar cheese; and
   Colby cheese.

2. The method of claim 1, wherein the sodium gluconate is added in a salt mixture to the curd.

3. The method of claim 2, wherein the salt mixture further comprises sodium chloride.

4. The method of claim 3, wherein the sodium chloride is added to the curd before the sodium gluconate is added to the curd.

5. The method of claim 2, further comprising:
   measuring the salt retention of the cheese; and
   selecting the amount of sodium gluconate added based the measured salt retention to result in an effective amount of sodium gluconate in the salt mixture to inhibit the growth of calcium lactate crystals.

6. The method of claim 1, wherein the sodium gluconate is added in an amount of greater than 0 to 10% of the weight of the curd.

7. The method of claim 6, wherein the sodium gluconate is added in an amount of greater than 0 to 5% of the weight of the curd.

8. The method of claim 7, wherein the sodium gluconate is added in an amount of 0.32 to 4.73% of the weight of the curd.

9. The method of claim 1, further comprising aging the cheese as a natural cheese for at least one week prior to consumption as a natural cheese, with the sodium gluconate inhibiting the growth of calcium lactate crystals during aging of the natural cheese.

10. The method of claim 1, wherein the cheese comprises greater than zero to 5.8% gluconate.

11. The method of claim 10, wherein the cheese comprises greater than zero to 4.5% gluconate.

12. The method of claim 11, wherein the cheese comprises about 0.26 to 2.8% gluconate.

13. The method of claim 1, further comprising:
   measuring the lactate content of the cheese; and
   selecting the amount of sodium gluconate added based upon the measured lactate content to result in an effective amount of gluconate in the cheese to inhibit the growth of calcium lactate crystals.

14. A method of making cheese, comprising:
   combining ingredients comprising:
      milk, nonfat milk, or cream, used alone or in combination;
      a lactic acid-producing bacterial culture;
      a clotting enzyme; and
      greater than zero to 10 percent by weight of sodium gluconate;
   separating and draining off whey from curd out of the combined ingredients before or after the addition of the sodium gluconate;
   pressing the curd into natural cheese before or after the addition of the sodium gluconate; and
   aging the natural cheese after the addition of the sodium gluconate to ripen the natural cheese, wherein the sodium gluconate inhibits the growth of calcium lactate crystals in the natural cheese as it ages, and wherein the cheese is selected from the group consisting of:
   Cheddar cheese; and
   Colby cheese.

15. A method of making cheese, comprising:
   developing acidity in milk and setting the milk;
   separating whey from the set milk to produce curd;

adding salt to the curd;
pressing the salted curd into natural cheese; and
aging the natural cheese to ripen the natural cheese into aged natural cheese;
wherein the resultant aged natural cheese comprises:
calcium;
lactate; and
gluconate, wherein the gluconate inhibits the growth of calcium lactate crystals in the natural cheese as it ages, and wherein the cheese is selected from the group consisting of:
Cheddar cheese; and
Colby cheese.

16. The method of making cheese of claim 15, wherein the amount of gluconate is from ¼ to ⅔ of the amount of lactate in the resultant aged natural cheese.

17. The method of making cheese of claim 16, wherein the amount of lactate is about 1.1 to 1.9% of the resultant aged natural cheese.

18. The method of making cheese of claim 17, wherein the amount of gluconate is about 0.26 to 2.8% of the resultant aged natural cheese.

19. The method of making cheese of claim 18, further comprising at least 0.03% sodium in the resultant aged natural cheese.

20. The method of making cheese of claim 1, further comprising curing the cheese to ripen the cheese, with the sodium gluconate inhibiting the growth of calcium lactate crystals during ripening of the cheese.

21. The method of making cheese of claim 20, wherein the curing is performed without pasteurizing.

* * * * *